(12) United States Patent
Kokudo

(10) Patent No.: US 7,016,333 B1
(45) Date of Patent: Mar. 21, 2006

(54) HIGH SPEED TIMESLOT ASSIGNMENT UNIT AND METHOD FOR A TDMA COMMUNICATION SYSTEM

(75) Inventor: Junichi Kokudo, Tokyo (JP)

(73) Assignee: NEC Corporation, Tokyo (JP)

( * ) Notice: Subject to any disclaimer, the term of this patent is extended or adjusted under 35 U.S.C. 154(b) by 818 days.

(21) Appl. No.: 09/721,959

(22) Filed: Nov. 27, 2000

(30) Foreign Application Priority Data

Nov. 26, 1999 (JP) .................................. 11-336763

(51) Int. Cl.
*H04B 7/212* (2006.01)
(52) U.S. Cl. ...................... 370/337; 370/329; 370/336; 370/345; 370/348; 370/349; 370/381
(58) Field of Classification Search ................ 370/329, 370/337, 458, 463, 336, 345, 348, 349, 381
See application file for complete search history.

(56) References Cited

U.S. PATENT DOCUMENTS

| | | | | |
|---|---|---|---|---|
| 5,210,747 A | * | 5/1993 | Gauthier et al. ............. | 370/463 |
| 5,241,541 A | * | 8/1993 | Farrell et al. ................ | 370/438 |
| 5,303,234 A | * | 4/1994 | Kou ............................ | 370/442 |
| 5,323,446 A | * | 6/1994 | Kojima et al. .............. | 455/437 |
| 5,347,513 A | * | 9/1994 | Abefelt et al. .............. | 370/381 |
| 5,659,698 A | * | 8/1997 | Weng et al. ................. | 711/220 |
| 5,682,419 A | * | 10/1997 | Grube et al. ................ | 455/450 |
| 5,790,535 A | * | 8/1998 | Kou ............................ | 370/337 |
| 5,822,313 A | * | 10/1998 | Malek et al. ................ | 370/332 |
| 5,862,135 A | * | 1/1999 | Petty ........................... | 370/376 |
| 5,862,136 A | * | 1/1999 | Irwin ....................... | 370/395.4 |
| 5,963,558 A | * | 10/1999 | Harada ........................ | 370/442 |
| 6,064,649 A | * | 5/2000 | Johnston ................... | 370/310.2 |
| 6,208,650 B1 | * | 3/2001 | Hassell et al. .............. | 370/392 |
| 6,249,526 B1 | * | 6/2001 | Loukianov ................... | 370/442 |
| 6,545,993 B1 | * | 4/2003 | Bharath et al. ............. | 370/337 |
| 6,728,254 B1 | * | 4/2004 | Stacey et al. ................ | 370/413 |

FOREIGN PATENT DOCUMENTS

| | | |
|---|---|---|
| JP | 10-285180 A | 10/1998 |
| JP | 11-252110 A | 8/1999 |
| JP | 2000-349729 A | 12/2000 |

\* cited by examiner

*Primary Examiner*—Wellington Chin
*Assistant Examiner*—Kevin Mew
(74) *Attorney, Agent, or Firm*—Sughrue Mion, PLLC

(57) ABSTRACT

In a TDMA/TDD transmitter, a control data generation unit receives assignment terms for a number of time slots and slot data from an external source, produces a set of assignment control data according to the assignment terms and the slot data and stores the set of assignment control data into an entry of a control data table in response to a transfer command signal. A sequence controller analyzes sets of assignment control data maintained in the control data generation unit and produces a number of address pointers. The address pointers are stored in an address pointer table in such a sequence that they can be sequentially read out in a desired transmission sequence. The aforesaid transfer command signal is supplied from the sequence controller to the control data generation unit in response to each of the address pointers. A framing unit sequentially reads address pointers from the starting address of the address pointer table, reads assignment control data from the control data table in accordance with the read address pointers, and formulates a frame. Transmit data stored in a data memory is inserted into the frame for transmission.

7 Claims, 3 Drawing Sheets

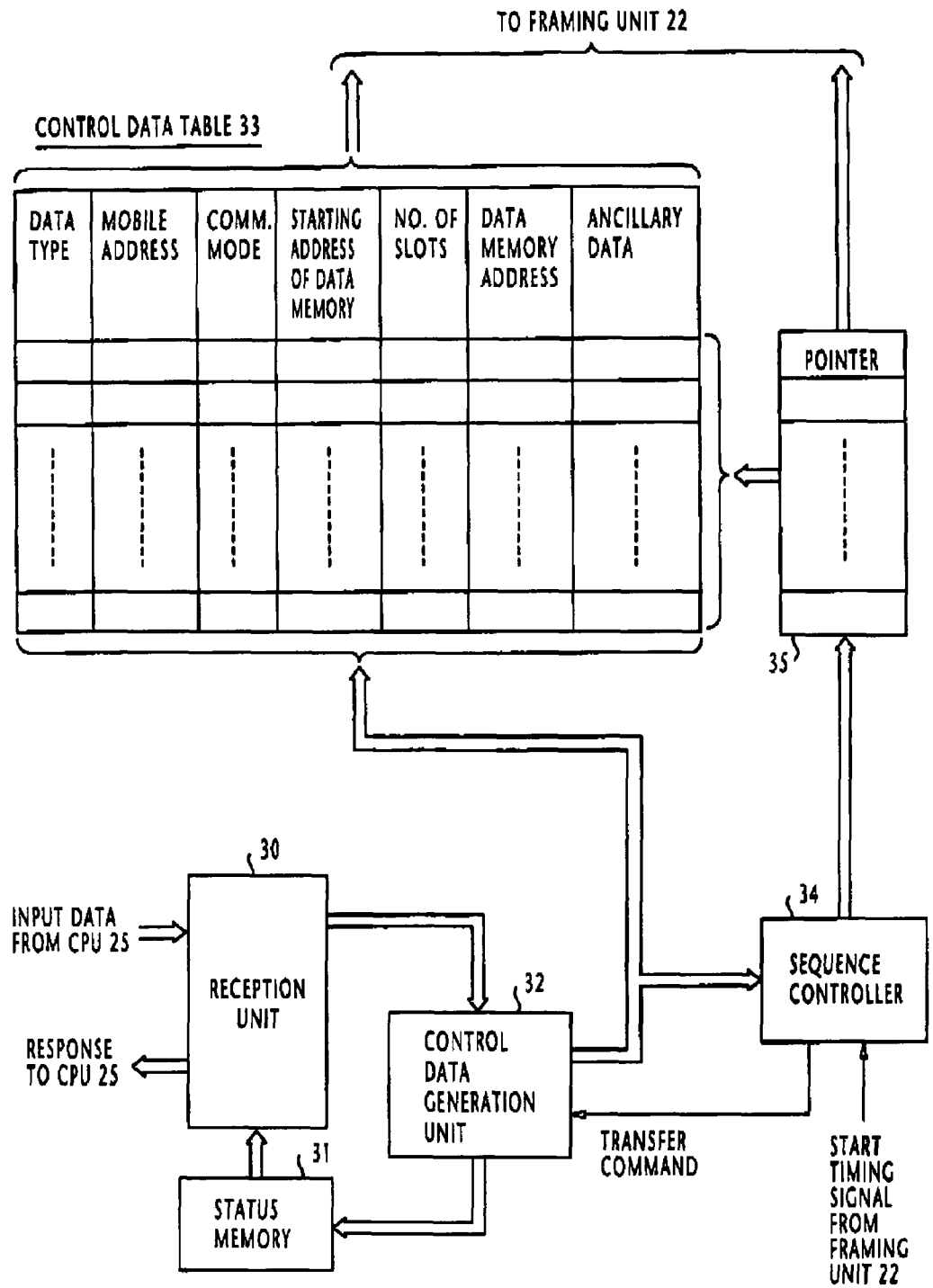

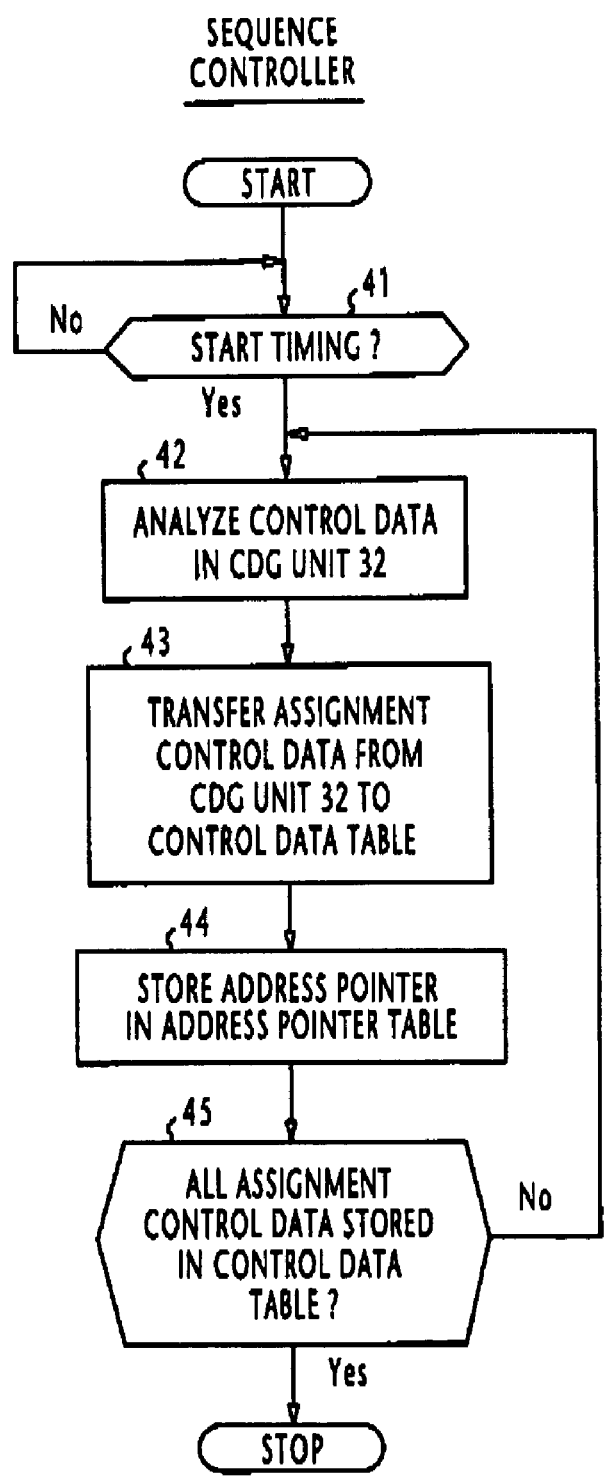

HIGH SPEED TIMESLOT ASSIGNMENT UNIT AND METHOD FOR A TDMA COMMUNICATION SYSTEM

BACKGROUND OF THE INVENTION

1. Field of the Invention

The present invention relates generally to TDMA or TDMA/TDD (time division multiple access/time division duplex) wireless communication systems, and more specifically to a timeslot assignment system and method for a TDMA or TDMA/TDD wireless communication system.

2. Description of the Related Art

FIG. 1 illustrates a prior art timeslot assignment unit of a TDMA/TDD cell-site station of a mobile communication network. The prior art timeslot assignment unit includes a reception unit 10, a slot status memory 11, a control data generation/sequence control (CDG/SC) unit 12 and an assignment table 13. Reception unit 10 is arranged to receive information indicating requirements, or assignment terms to be met for each timeslot to be assigned. In response to an assignment request signal, the reception unit 10 accesses the status memory 11 to check to see if the timeslots requested can be accommodated or not, and sends back a response to the requesting source with an indication as to the check result. If all the requested timeslots can be accommodated, the reception unit 10 sends an assignment command signal to the CDG/SC unit 12. In response to the assignment command signal, the CDG/SC unit 12 receives the assignment terms and produces therefrom a plurality of control data and stores them into the assignment table 13, the contents of which are used by a framing unit when a frame is formulated for transmission. The control data stored in the assignment table 13 must be reordered in such a sequence that it conforms to the sequence in which frames are transmitted. However, the reordering is based on the memory swapping principle, and hence it requires a complex logic circuit. Because of the complex logic circuitry, the prior art timeslot assignment unit cannot operate at a high speed.

SUMMARY OF THE INVENTION

It is therefore an object of the present invention to provide a high speed timeslot assignment unit and method for TDMA or TDMA/TDD communication systems.

The high speed operation is attained by using pointer addressing instead of prior art memory swapping.

According to a first aspect, the present invention provides a slot assignment unit for use in a TDMA transmitter, which comprises first and second tables. A control data generation unit is provided for receiving assignment terms for a plurality of time slots and slot data from an external source, producing a set of assignment control data according to the assignment terms and the slot data and storing the set of assignment control data into an entry of the first table in response to a command signal applied thereto. A sequence controller analyzes a plurality of sets of assignment control data, produces a plurality of address pointers, and stores address pointers in the second table in such a sequence that the address pointers can be sequentially read out in a desired transmission sequence, and supplies the command signal to the control data generation unit in response to each of the address pointers.

According to a second aspect, the present invention provides a TDMA transmitter comprising a first table, a second table, a control data generation unit for receiving assignment terms for a plurality of time slots and slot data from an external source, producing a set of assignment control data according to the assignment terms and the slot data and storing the set of assignment control data into an entry of the first table in response to a command signal applied thereto. A sequence controller is provided for analyzing a plurality of sets of assignment control data, producing a plurality of address pointers, storing the address pointers in the second table in such a sequence that the address pointers can be sequentially read out from a starting address, and supplying the command signal to the control data generation unit in response to each of the address pointers. A framing unit sequentially reads address pointers from the starting address of the second table and reads assignment control data from entries of the first table specified by the read address pointers and formulates a frame with the read assignment control data.

According to a third aspect, the present invention provides a slot assignment method for a TDMA transmitter, comprising the steps of (a) receiving assignment terms for a plurality of time slots, (b) producing a set of assignment control data according to the assignment terms, (c) repeating steps (a) and (b) to produce a plurality of sets of assignment control data, (d) analyzing said plurality of sets of assignment control data, (e) storing one of said sets of assignment control data into an entry of a first table, (f) storing an address pointer in a second table corresponding to said entry of said first table, and (g) repeating steps (d) to (f) until all assignment control data are stored in the first table. The slot assignment method may further includes the steps of sequentially reading address pointers from a starting address of the second table and reading assignment control data from the first table in accordance with the read address pointers, and formulating a frame with the read assignment control data.

BRIEF DESCRIPTION OF THE DRAWINGS

The present invention will be described in detail further with reference to the following drawings, in which:

FIG. 3 is a block diagram of the slot assignment unit of the present invention; and FIG. 4 is a flowchart of the operation of a sequence controller according to the present invention.

DETAILED DESCRIPTION

Figure 1:
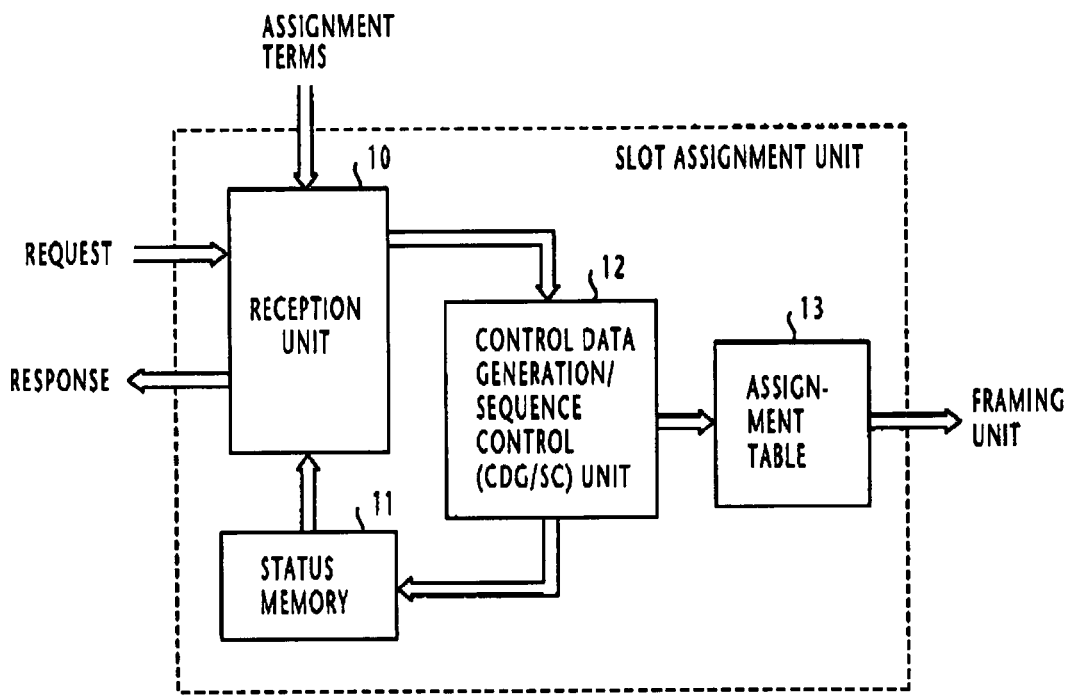
FIG. 1 is a block diagram of a prior art slot assignment unit of a TDMA/TDD cell-site station.
Figure 2:
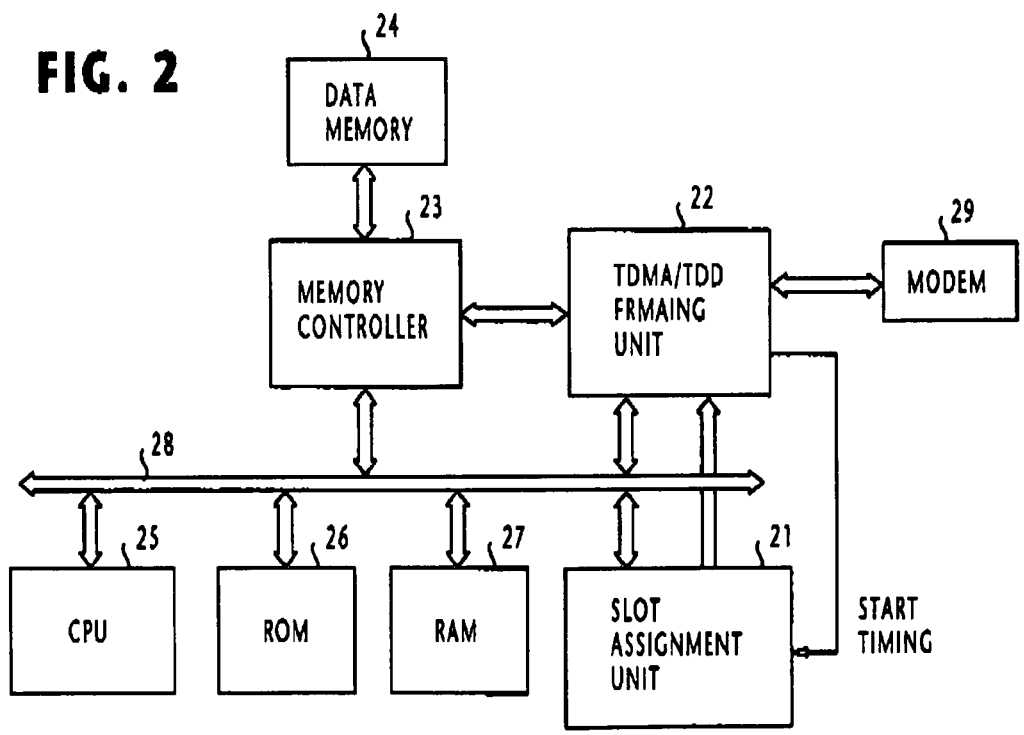
FIG. 2 is a block diagram of a TDMA/TDD cell-site system in which the timeslot assignment unit of the present invention is incorporated.

Referring now to FIG. 2, there is shown a transceiver that can be used in a demand-assigned dynamic TDMA (time division multiple access) system or a dynamic TDMA/TDD (time division multiple access/time division duplex) system in which a TDMA frame is segmented into timeslots (or simply slots) and transmit/receive unit data, or packets (such as data packets and control packets) are assigned to a plurality of slots and scheduled on an on-demand basis. The transceiver is particularly designed to be used as a cell-site station of a TDMA cellular mobile communication network.

The TDMA/TDD scheduling and framing functions of a cell-site station is embodied in the transceiver of FIG. 2, in which the cell-site station is comprised of a slot assignment unit 21, a TDMA/TDD framing unit 22 to which a modem 29 is connected, a memory controller 13 with which a data memory 24 is associated, a CPU 25, a ROM 26 and a RAM 27, all of which are connected to a common bus 28. CPU 25 operates according to a programmed routine stored in the ROM 16 to perform memory control, TDMA/TDD scheduling, framing and slot assignment control. RAM 27 serves as a work area for data to be processed by the CPU 25. Data memory 24 is accessed by the memory controller 23 to store data to be transmitted to or received from mobile terminals via the framing unit 22.

CPU 25 constantly monitors the contents of the data memory 24 via the memory controller. When a data packet or a control packet is stored in the data memory 24, the CPU 25 determines the size of the packet, the address of the packet in the data memory 24, the packet type, and the destination address and produces an assignment request signal containing these items of slot data. CPU 25 further produces information regarding the requirements or assignment terms to be met for each time slot to be assigned. The assignment terms information include priority levels classified according to communication services and urgency, type of packets, and uplink-to-downlink ratio within the frame.

As shown in detail in FIG. 3, the slot assignment unit 21 is comprised of a reception unit 30, a status memory 31, a control data generation (CDG) unit 32, a control data table 33, a sequence controller 34 and an address pointer table 35.

From the CPU 25, the reception unit 30 receives the assignment request signal and the assignment terms signal. In response to the assignment request signal, the reception unit 30 calculates the number of slots that can be assigned to TDMA frames based on data contained in the request signal as well as on the assignment terms and accesses the status memory 31 to check to see if the determined slots can be accommodated or not by the currently available slots, and sends back a response to the CPU 25 indicating the result of the check.

If all the requested slots can be accommodated, the reception unit 30 sends an assignment command signal to the CDG unit 32. In response to the command signal, the CDG unit 32 receives the assignment request signal and the assignment terms signal from the reception unit 30. By using the assignment terms, the CDG unit 32 produces a set of assignment control data for the assignment unit (ten slots, for example) and produces a plurality of sets of assignment control data by repeatedly receiving assignment request signals. CDG unit 32 holds the sets of assignment control data until it receives a transfer command signal from the sequence controller 34 for each entry of the control data table 33.

Each set of assignment control data includes data type, mobile address, communication mode, starting address of slots in the data memory 24, the number of slots contained in an assignment unit, the address of the assigned slot in the data memory 24 and ancillary data. When each set of assignment control data is produced, the CDG unit 32 updates the slot status memory 31. When the slot status memory 31 is overflowed, assignment request from the CPU 25 will be rejected. For each assignment request from the CPU 25, a set of assignment control data is stored in one entry of the control data memory 33.

Sequence controller 34 responds to the start timing signal from the framing unit 22 by analyzing a plurality of sets of assignment control data maintained in the CDG unit 32 and sequentially produces address pointers according to the TDMA slot assignment rule, indicating the addresses of the entries of the control data table 33. The address pointers are stored into an address pointer table 35 such that corresponding assignment control data are read out from the control data table 33 in the same sequence as time slots are transmitted from the cell-site station. Address pointer table 35 may be implemented in a configuration similar to a shift register in which stored address pointers are automatically shifted when a new address pointer is stored if the storage location of the new pointer is ahead of, or in between, the previously stored pointers.

As shown in FIG. 4, the write operation of the sequence controller 34 starts with decision step 41 when the start timing signal is received from the framing unit 22 and analyzes a plurality of sets of assignment control data maintained in the CDG unit 32 (step 42). At step 43, the sequence controller 34 supplies a transfer command signal to the CDG unit 32 to transfer its assignment control data into the first entry of the slot data table 33 and produces a corresponding address pointer and stores it in the first entry of the address pointer table 35 (step 44). If all assignment control data of the current assignment unit have been stored (step 45), the sequence controller 34 terminates the routine. If not, the sequence controller 34 returns to step 42 to repeat the same process until all assignment control data of the assignment unit are stored in the control data table 33 with their corresponding address pointers in the address table 35. Therefore, steps 42 to 45 are repeatedly performed a number of times corresponding in number to assignment request signals received from the CPU 25.

When a frame is formulated, the framing unit 22 sequentially reads address pointers from the starting address of the address pointer table 35. Using the read address pointers, the framing unit reads the contents of the control data table 33 and inserts transmit data into assigned slots of the frame for transmission.

What is claimed is:

1. A slot assignment unit for use in a time division multiple access (TDMA) transmitter, comprising:
a first table;
a second table;
a control data generation unit for receiving assignment terms for a plurality of time slots and slot data from an external source, producing a set of assignment control data according to the assignment terms and the slot data and storing the set of assignment control data into an entry of said first table in response to a command signal applied thereto; and
a sequence controller for analyzing a plurality of said sets of assignment control data, producing a plurality of address pointers, storing said plurality of address pointers in said second table in such a sequence that the address pointers can be sequentially read out in a desired transmission sequence, and supplying said command signal to said control data generation unit in response to each of said address pointers,
wherein said TDMA transmitter includes a data memory for storing a plurality of transmit data, and wherein said set of assignment control data stored in said first table includes an address of a communication terminal, a starting address point of each transmit data in said data memory, and a count number of slots assigned to said entry.

2. A time division multiple access (TDMA) transmitter comprising:
a first table;
a second table;
a control data generation unit for receiving assignment terms for a plurality of time slots and slot data from an external source, producing a set of assignment control data according to the assignment terms and the slot data and storing the set of assignment control data into an entry of said first table in response to a command signal applied thereto; and a sequence controller for analyzing a plurality of said sets of assignment control data, producing a plurality of address pointers, storing said plurality of address pointers in said second table in such a sequence that the address pointers can be sequentially read out from a staring address of the second table, and supplying said command signal to said control data generation unit in response to each of said address pointers;

a data memory for storing a plurality of transmit data; and a framing unit for sequentially reading address pointers from said starting address of said second table and reading assignment control data from entries of said first table which are specified by the read address pointers and formulating a frame with the read assignment control data and said plurality of transmit data from said data memory, wherein said set of assignment control data stored in said first table includes and address of an assigned communication terminal, a starting address point of each transmit data in said data memory, and a count number of assigned slots.

3. A slot assignment method for a time division multiple access (TDMA) transmitter, comprising the steps of:
 a) receiving assignment terms for a plurality of time slots and slot data;
 b) producing a set of assignment control data according to the assignment terms and the slot data;
 c) repeating steps (a) and (b) to produce a plurality of sets of assignment control data;
 d) analyzing said plurality of sets of assignment control data;
 e) storing one of said sets of assignment control data into an entry of a first table;
 f) storing an address pointer in a second table corresponding to said entry of said first table; and
 g) repeating steps (d) to (f) until all of said assignment control data are stored in the first table.

4. The slot assignment method of claim 3, further comprising the steps of:
 sequentially reading address pointers from a starting address of said second table and reading said plurality of sets of assignment control data from said first table in accordance with the read address pointers; and
 formulating a frame with the assignment control data read from the first table.

5. The slot assignment unit of claim 1, wherein the assignment terms include one or more of:
 priority levels classified according to at least one of communication services and urgency,
 types of packets, and
 an uplink-to-downlink ratio within a frame.

6. The TDMA transmitter of claim 2, wherein the assignment terms include one or more of:
 priority levels classified according to at least one of communication services and urgency,
 types of packets, and
 an uplink-to-downlink ratio within the frame.

7. The slot assignment method of claim 3, wherein the assignment terms include one or more of:
 priority levels classified according to at least one of communication services and urgency,
 types of packets, and
 an uplink-to-downlink ratio within a frame.

* * * * *